March 22, 1938.   O. P. DI GIOVANNI   2,112,146
COUPLING FOR HYDRAULIC BRAKES
Filed Feb. 8, 1937
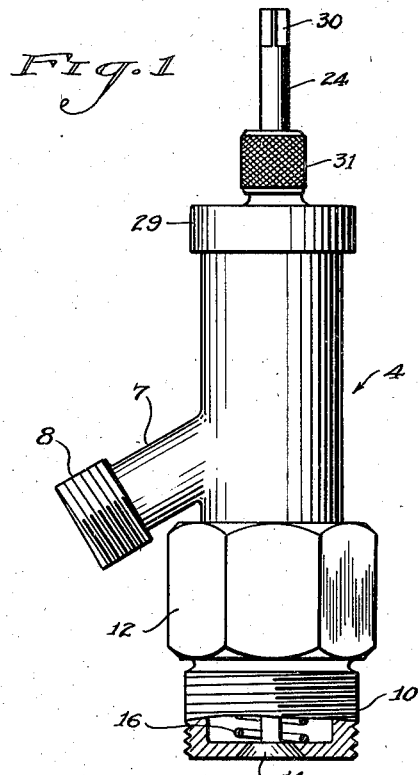
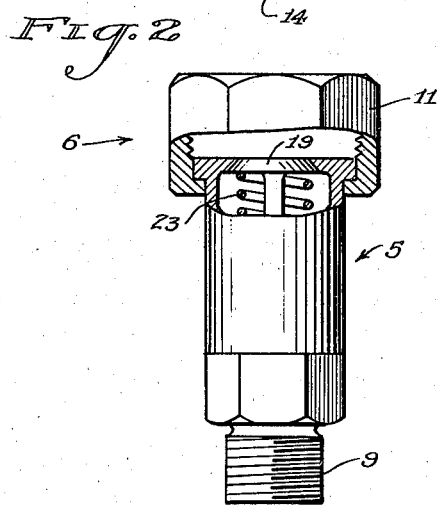
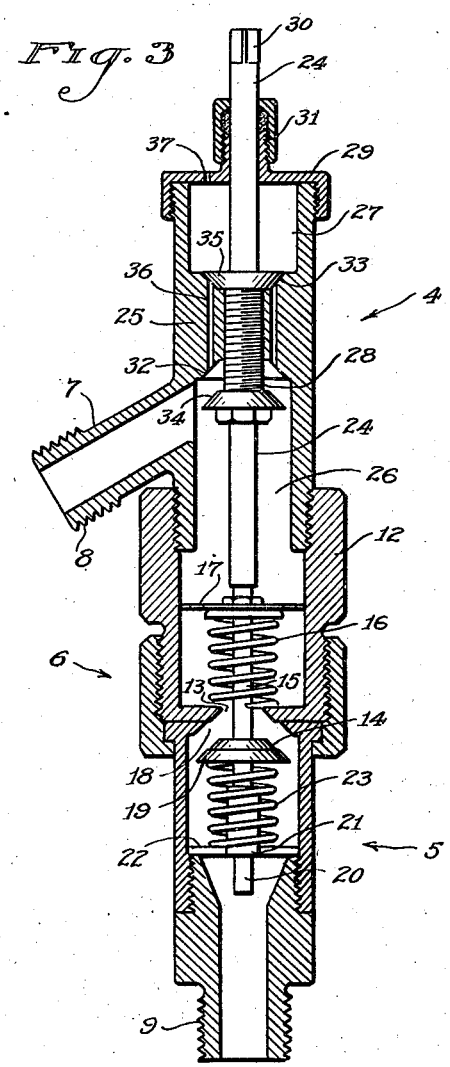
Onofrio P. Di Giovanni
INVENTOR Patented Mar. 22, 1938

2,112,146

UNITED STATES PATENT OFFICE 2,112,146

COUPLING FOR HYDRAULIC BRAKES

Onofrio P. Di Giovanni, Brooklyn, N. Y.

Application February 8, 1937, Serial No. 124,732

5 Claims. (Cl. 137—69)

The present invention relates to pipe couplings for the joining of pressure fluid conveying conduits and more particularly to such devices for use in the coupling of hydraulic brake lines or the like.

The invention is particularly applicable to vehicles equipped with a hydraulic brake system, the same being employed in the coupling of an auxiliary brake system such as that of a vehicle trailer, the device being adapted to effect the mentioned coupling without the loss of any brake fluid from the lines.

The general object of the invention resides in the provision of a pair of separable fittings for attachment to the respective ends of a hydraulic brake pipe, each of the fittings being equipped with valve elements so arranged as to permit the making of the coupling without releasing any of the fluid out of the pipe lines.

A further object is to provide a coupling of the character indicated including valves for closing each of the separable fittings, the coupling ends and the mentioned valves being so formed as to expel all air from the coupling during the making of the same, thereby obviating the admission of any air into the brake lines.

Another object of the invention is to provide in a hydraulic brake line coupling device, valve operating means for opening the valves of the separable fittings, the operating means being adapted to form a positive closure in fully opened or closed position of the valves, thereby avoiding any further leakage of the fluid through the housing of the device.

A still further object is to incorporate in a brake line coupling device of the character indicated a means for bleeding any entrapped air in the brake lines, the mentioned means being operable by the means directed to the operation of the closure valves.

The invention will be fully and comprehensively understood from a consideration of the following detailed description when read in connection with the accompanying drawing which forms part of the application.

In the drawing,

Figure 1 is a side elevational view of one of the fittings comprising the separable coupling, a portion thereof being broken away in central section;

Figure 2 is a view similar to Figure 1 illustrating the complemental fitting of the separable coupling, a portion of same being broken away in central section; and Figure 3 is a longitudinal sectional view through the entire coupling device, the separable fittings being coupled together in readiness for use in transmitting brake fluid therethrough.

Reference is now had to the accompanying drawing for a more detailed description thereof, in which the numeral 4 indicates the upper of a pair of separable fittings, the numeral 5 indicating the lower fitting, each of the mentioned fittings being adapted to be coupled together at their abutting ends by suitable means such as by a union coupling 6, illustrated in Figure 3. The fitting 4 is provided with a branch connection 7 extending preferably downwardly therefrom and adapted to be connected to a hydraulic pipe end by suitable means such as the threaded end 8. The fitting 5 is likewise adapted to receive at its threaded end 9 another pipe end to be coupled.

In the use of the device as aforementioned, in the coupling of a trailer brake system to that of a vehicle, the vehicle brake line is connected to the branch 7 of the fitting 4 and the trailer brake line is connected to the threaded end 9 of the fitting 5. The joining of the two brake systems to be operated in unison is effected by connecting the fittings 4 and 5 at their abutting ends such as by making up the coupling 6. The coupling 6 is effected preferably by threading the end 10 of the fitting 4 to receive thereon a threaded collar 11 rotatably carried on the fitting 5.

The body 4 is provided with an end member 12 including the threaded portion 10 thereon, the member 12 being detachable from the body primarily for the purpose of assembling the parts constituting the interior mechanism. In the axial end of the member 12 is formed a valve seat defining an aperture 13, the valve seat being adapted to receive thereon a valve 14 to close the aperture 13. The valve 14 is preferably arranged to open outwardly from the member 12 and is carried on a valve stem 15, being urged by a spring 16 to closed position. The free end of the valve stem 15 carries a guide disk 17 open at its intermediate area to permit the passage of fluid therethrough and slidably engages the interior of the member 12.

The body of the fitting 5, at its axial end, is likewise provided with an aperture 18 bordered by a valve seat adapted to receive thereon a valve 19, the valve being carried on a valve stem 20 slidably retained in a valve guide 21 including radial arms 22 projecting therefrom and having their free ends suitably secured to the fitting 5. The valve 19 is urged to close the aperture 18 by a suitable spring 23 backed on the arms 22 and engaging the inner side of the valve 19.

It will be noted that the valve 19 is adapted to open inwardly in contrast to the outward opening of the valve 14 which, being made of a slightly smaller diameter than valve 19, is therefore adapted to pass through the aperture 18 during its opening movement and thereby coactively open the valve 19.

As aforeindicated, one of the features embodied in the invention assures the exclusion of air or other foreign gaseous matter between the free ends of the fittings 4 and 5 so that upon completion of the coupling of these fittings, the transmission of fluid therethrough may be effected without admission of air into the line. To accomplish this effect the axial ends of each of the fittings 4 and 5 together with the respective valves 14 and 19 associated therewith, form substantially flat surfaces adapted to intimately engage each other to exclude all air therebetween. Although it is preferred to form the mentioned fitting ends in a substantially flat surface, it will be apparent that these surfaces may be otherwise formed to present complementarily registering surfaces, such for example as convex and concave formations.

By joint reference to Figures 1 and 2 it will be observed that the respective valves of the fittings 4 and 5 are yieldably held in closed position while the ends of the fittings are uncoupled. In this manner the fluid under pressure within the pipe lines terminated by the respective fittings is retained therein without chance of leakage. Upon completion of the coupling effecting the joining of the fittings 4 and 5 as illustrated in Figure 3, the valves 14 and 19 are coactively opened by actuating one of the mentioned valves. In the preferred arrangement the operation of valve 14 serves to open both valves in that same is disposed to abut the valve 19 so as to push same to open position, a suitable means being provided for engagement with the valve stem 15 to actuate the valves.

Preferably a spindle 24 is provided, the same being adapted to have its free end abut the valve stem 15, the spindle 24 being slidably and rotatably carried in the body of the fitting 4. The fitting 4 has formed therein intermediate its ends, a partition 25 thereby dividing the interior of the fitting 4 into a chamber 26, in which the mechanism associated with the valve 14 is housed, and a reservoir 27 at the opposite end of the fitting 4. The partition 25 has a threaded bore axially disposed therein in which is engaged a threaded portion 28 intermediate the spindle 24, the latter extending through a cap 29 and terminating in a key end 30 to receive a suitable tool for rotating the spindle 24. The cap 29 includes a packing gland 31 forming the slide bearing for the spindle 24.

At each end of the partition 25 and adjacent the respective chambers 26 and 27 are provided valve seats 32 and 33 in which may engage corresponding opposed valves 34 and 35 carried on the spindle 24.

It is to be noted here that upon rotation of the spindle 24, the action of the threaded portion 28 serves to move the spindle axially to open the valve 14, the threaded portion 28 being of ample length to permit sufficient axial movement. In either extreme position of the spindle 24 the valves 34 or 35 will engage their respective seats 32 or 33 to positively close the threaded bore of the partition 25 against passage of fluid therethrough.

As aforementioned, the device may be employed to accomplish the bleeding or venting of entrapped air from the brake lines, in which instance the reservoir 27 is effective. For use of the device in this manner it is desirable to mount the fitting 4 so that its axis is substantially vertical with the branch 7 thereof directed downwardly. In such arrangement the reservoir 27 will assume an elevated position with reference to the associated brake pipe lines since same is superimposed upon the fitting 4. It may be assumed that either valve 34 or 35 is normally closed and when it is desired to release entrapped air it will be observed that such air will rise to a region below the partition 25 which has one or more ports 36 extending therethrough, the mentioned ports terminating at each end in the respective valve seats 32 and 33 to be closed by either valve 34 or 35. Regardless of which of the mentioned valves is closed, in order to vent the air below the partition 25 it will be seen that by merely initially opening the proper valve that the entrapped air will pass through the ports 36 into the reservoir 27 and thus to the atmosphere through a vent pole 37. The brake fluid within the reservoir 27 will thus displace the entrapped air after which the valve 34 or 35 is closed, leaving the brake system in readiness for use.

It is of course desired to effect the bleeding of the entire brake system while the fittings 4 and 5 are coupled. It will however be noted that the brake line connected to the fitting 4 may be bleeded independent of the line connected to the fitting 5 while the union 6 is uncoupled since the spindle 24 is of such length as to permit the initial opening of the valve 34 without operation of the valve 14.

It is to be understood that this improvement is capable of extended application and is not confined to the exact showing of the drawing nor to the precise construction described and, therefore, such changes and modifications may be made therein as to not affect the spirit of the invention nor exceed the scope thereof as expressed in the appended claims.

What is claimed as new is:

1. A coupling device of the character described comprising a first fitting and a second fitting each adapted to form the terminal end of a pair of pipes to be coupled, means for joining said fittings, a valve in said first fitting arranged to open outwardly thereof, a valve in said second fitting arranged to open inwardly thereof, said first valve being adapted to engage said second valve for actuating same, and operating means for said first fitting valve, said fittings and the valves thereof being arranged to form a complete contact at their adjoining surfaces so as to displace all voids therebetween, said valve operating means comprising a stem threadedly engaging said first fitting and having the end thereof adapted to abut said first valve to open same.

2. A coupling device of the character described comprising a pair of separable fittings adapted to form the terminal ends of pipes to be coupled, means for joining said fittings, openable closure means in each fitting, each of said closure means being yieldably held in closed position and adapted to abut each other for movement in unison, one of said fittings including a body portion having a partition therein, a valve stem threadedly engaged in said partition for opening said closure means, and opposed valves carried on said stem and adapted to engage the respective walls of said partition.

3. A coupling device of the character described comprising a pair of separable fittings adapted to form the terminal end of a pair of pipes to be coupled, means for joining said fittings, openable closure means in each fitting, each of said closure means being yieldably held in closed position and adapted to abut each other for movement in unison, one of said fittings including a body portion and a partition therein dividing same into a valve chamber and a reservoir, a valve stem threadedly engaged in said partition for opening said closure means, and opposed valves carried on said stem and adapted to engage the respective walls of said partition, said partition having a port therethru communicating between said valve chamber and said reservoir and adapted to be closed at either end by said opposed valves.

4. A coupling device of the character described comprising a first fitting and a second fitting each adapted to form the terminal end of a pair of pipes to be coupled, means for joining said fittings, a valve in said first fitting arranged to open outwardly thereof, a valve in said second fitting arranged to open inwardly thereof, said first valve being adapted to engage said second valve for actuating same, and operating means for said first fitting valve, said fittings and the valves thereof being arranged to form a complete contact at their adjoining surfaces so as to displace all voids therebetween, one of said fittings including a body portion having a partition therein dividing same into a valve chamber and a reservoir, a valve stem threadedly engaged in said partition for opening said valves, and opposed valves carried on said stem and adapted to engage the respective walls of said partition, said partition having a port therethru communicating between said valve chamber and said reservoir and adapted to be closed at either end by said opposed valves.

5. A coupling device of the character described comprising a pair of separable fittings adapted to form the terminal ends of pipes to be coupled, means for joining said fittings, openable closure means in each fitting, each of said closure means being yieldably held in closed position and adapted to abut each other for movement in unison, one of said fittings including a body portion having a partition therein, a valve stem threadedly engaged in said partition for opening said closure means, and valve surfaces on said stem adapted to engage the respective walls of said partition.

ONOFRIO P. DI GIOVANNI.